(12) United States Patent
Midori

(10) Patent No.: US 9,462,095 B2
(45) Date of Patent: Oct. 4, 2016

(54) TOUCH INPUT ELECTRONIC DEVICE

(71) Applicant: KYOCERA Corporation, Kyoto-shi, Kyoto (JP)

(72) Inventor: Fumiya Midori, Shijonawate (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/653,806

(22) PCT Filed: Dec. 16, 2013

(86) PCT No.: PCT/JP2013/083632
§ 371 (c)(1),
(2) Date: Jun. 18, 2015

(87) PCT Pub. No.: WO2014/098032
PCT Pub. Date: Jun. 26, 2014

(65) Prior Publication Data
US 2015/0350393 A1    Dec. 3, 2015

(30) Foreign Application Priority Data

Dec. 18, 2012    (JP) .................................. 2012-275663

(51) Int. Cl.
*H04M 1/00* (2006.01)
*H04M 1/02* (2006.01)
(Continued)

(52) U.S. Cl.
CPC ........... *H04M 1/026* (2013.01); *H04B 1/3888* (2013.01); *H04M 1/18* (2013.01); *H04B 2001/3894* (2013.01); *H04M 2250/22* (2013.01)

(58) Field of Classification Search
CPC ............................ H04M 1/026; H04B 1/3888
USPC ............ 455/550.1, 566, 90.3, 575.1; 312/7.1
See application file for complete search history.

(56) References Cited

U.S. PATENT DOCUMENTS 8,442,593 B1 *   5/2013   Kwon ................. H04M 1/0266
                                                          455/556.1
9,165,550 B2 *  10/2015   Richardson ........... G10K 11/18
2011/0219882 A1  9/2011   Nakamura
(Continued)

FOREIGN PATENT DOCUMENTS

JP    2008-282226 A    11/2008
JP    2010-096316 A     4/2010
(Continued)

OTHER PUBLICATIONS

International Search Report dated Feb. 10, 2014 issued for International Application No. PCT/JP2013-083632.
(Continued)

*Primary Examiner* — Sonny Trinh
(74) *Attorney, Agent, or Firm* — Procopio Cory Hargreaves and Savitch LLP

(57) ABSTRACT

A touch input electronic device according to the present invention comprises a main body which has a waterproofed internal space and an air hole located on the surface thereof, an operation surface which is disposed on the surface of the main body and receives touch input, an atmospheric pressure sensor which is disposed in the internal space, an air flow passage which is formed inside the main body and leads from the air hole to the atmospheric pressure sensor, and a breathable waterproof sheet which blocks the air hole.

3 Claims, 4 Drawing Sheets

(51) Int. Cl.
  *H04B 1/3888* (2015.01)
  *H04M 1/18* (2006.01)
  *H04B 1/38* (2015.01)

(56) References Cited

U.S. PATENT DOCUMENTS

| | | | |
|---|---|---|---|
| 2012/0162881 A1 | 6/2012 | Usui | |
| 2012/0188362 A1* | 7/2012 | Takimoto | G01L 19/149 348/81 |
| 2015/0253819 A1* | 9/2015 | Choi | G06F 1/182 361/679.02 |
| 2015/0282364 A1* | 10/2015 | Moon | H04M 1/0202 174/50.51 |

FOREIGN PATENT DOCUMENTS

| | | |
|---|---|---|
| JP | 2010-283451 A | 12/2010 |
| JP | 2011-114510 A | 6/2011 |
| JP | 2011-191213 A | 9/2011 |
| JP | 2012-039228 A | 2/2012 |
| JP | 2012-146715 A | 8/2012 |
| JP | 2012-163938 A | 8/2012 |
| JP | 2012-213022 A | 11/2012 |

OTHER PUBLICATIONS

Office Action dated Jun. 28, 2016, issued in counterpart Japanese application No. 2012-275663.

* cited by examiner

TOUCH INPUT ELECTRONIC DEVICE

TECHNICAL FIELD

The present invention relates to an electronic device such as a mobile phone which includes a main body having a waterproof structure and an operation surface for touch input disposed on the surface of the main body.

BACKGROUND ART

Conventionally, in an electronic device such as a mobile phone, waterproofing for a main body which includes a built-in electronic component has been achieved to avoid failure of the electronic component caused by the entry of water.

Further, in an electronic device such as a mobile phone, it has been proposed to detect the ambient atmospheric pressure using an atmospheric pressure sensor built in a main body of the device to achieve various functions on the basis of the detected atmospheric pressure.

In view of the above, an atmospheric pressure sensor may be installed in a waterproof electronic device. In such an electronic device, the atmospheric pressure sensor is mounted in an internal space of a main body having a waterproof structure.

However, the following problem may occur in such an electronic device. The internal space of the main body has airtightness. Further, a touch operation surface for touch input is disposed on the surface of the main body. Thus, every time the touch operation surface is pressed, the internal space of the main body contracts and expands. The pressure in the internal space fluctuates along with the contraction and expansion of the internal space, which may cause an error in a value detected by the atmospheric pressure sensor.

Therefore, it is desired in a waterproof touch input electronic device provided with an atmospheric pressure sensor to maintain the detection accuracy of the atmospheric pressure sensor at a high level.

SUMMARY OF THE INVENTION

A touch input electronic device according to the present invention comprises with a main body which has a waterproofed internal space and an air hole located on the surface thereof, an operation surface which is disposed on the surface of the main body and receives touch input, an atmospheric pressure sensor which is disposed in the internal space, an air flow passage which is formed inside the main body and leads from the air hole to the atmospheric pressure sensor, and a breathable waterproof sheet which blocks the air hole.

DETAILED DESCRIPTION OF EMBODIMENT

Hereinbelow, an embodiment in which the present invention is embodied as a mobile phone will be specifically described with reference to the drawings.

Figure 1:
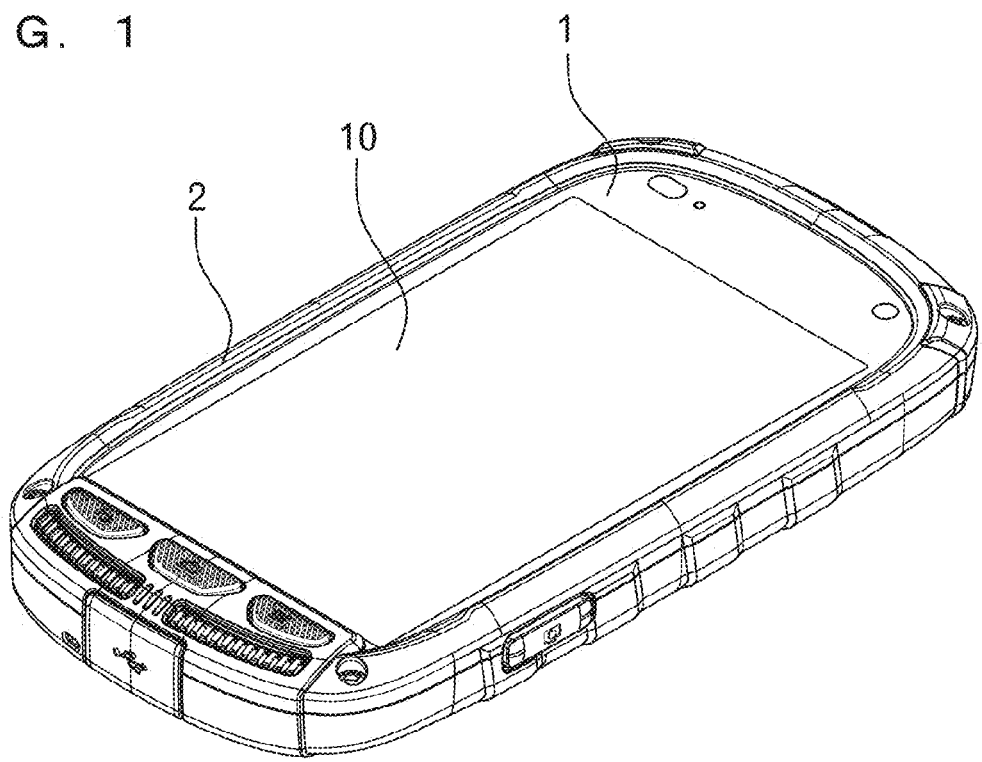
FIG. 1 is a perspective view of a mobile phone which is an embodiment of the present invention.
Figure 2:
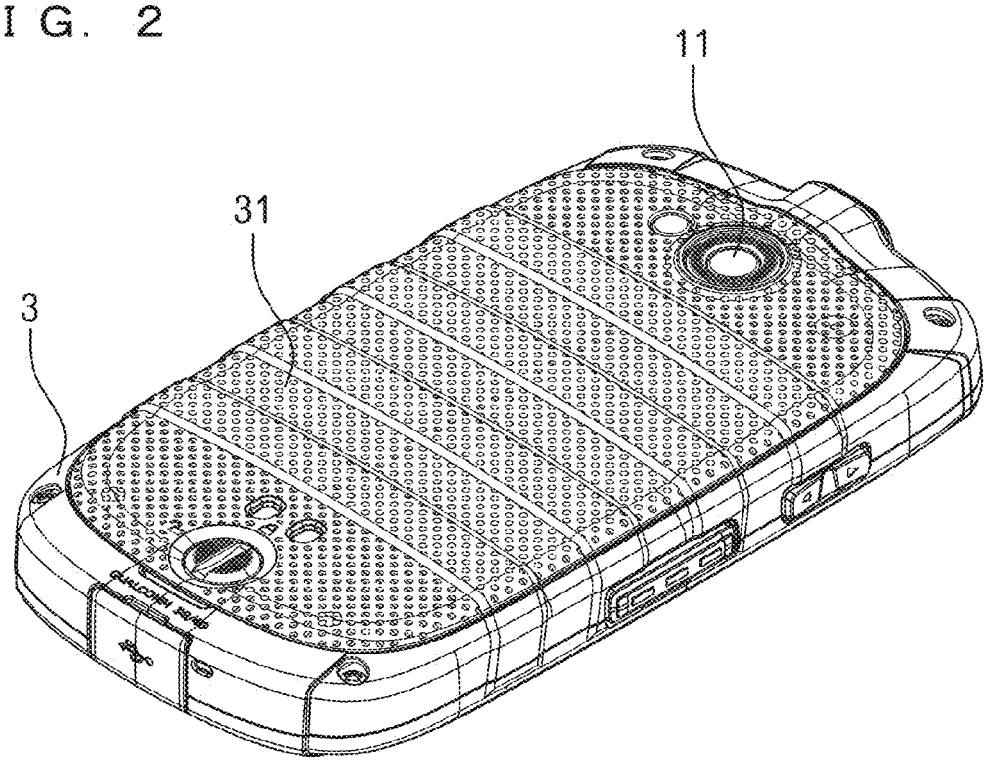
FIG. 2 is a perspective view illustrating the back face of the mobile phone.

As illustrated in FIGS. 1 and 2, a mobile phone as an embodiment of the present invention comprises a main body 1 which includes a touch panel and a display both built therein. The surface of the main body 1 is covered with a front cover panel 2 and a back cover panel 3. A battery cover 31 is detachably attached to the back cover panel 3.

A touch operation surface 10 is exposed on the front cover panel 2. The touch operation surface 10 enables image display on the display and touch input on the touch penal. A photographing window 11 for photographing with a camera is exposed on the battery cover 31.

Various pieces of information can be input by touching the touch operation surface 10.

Figure 5:
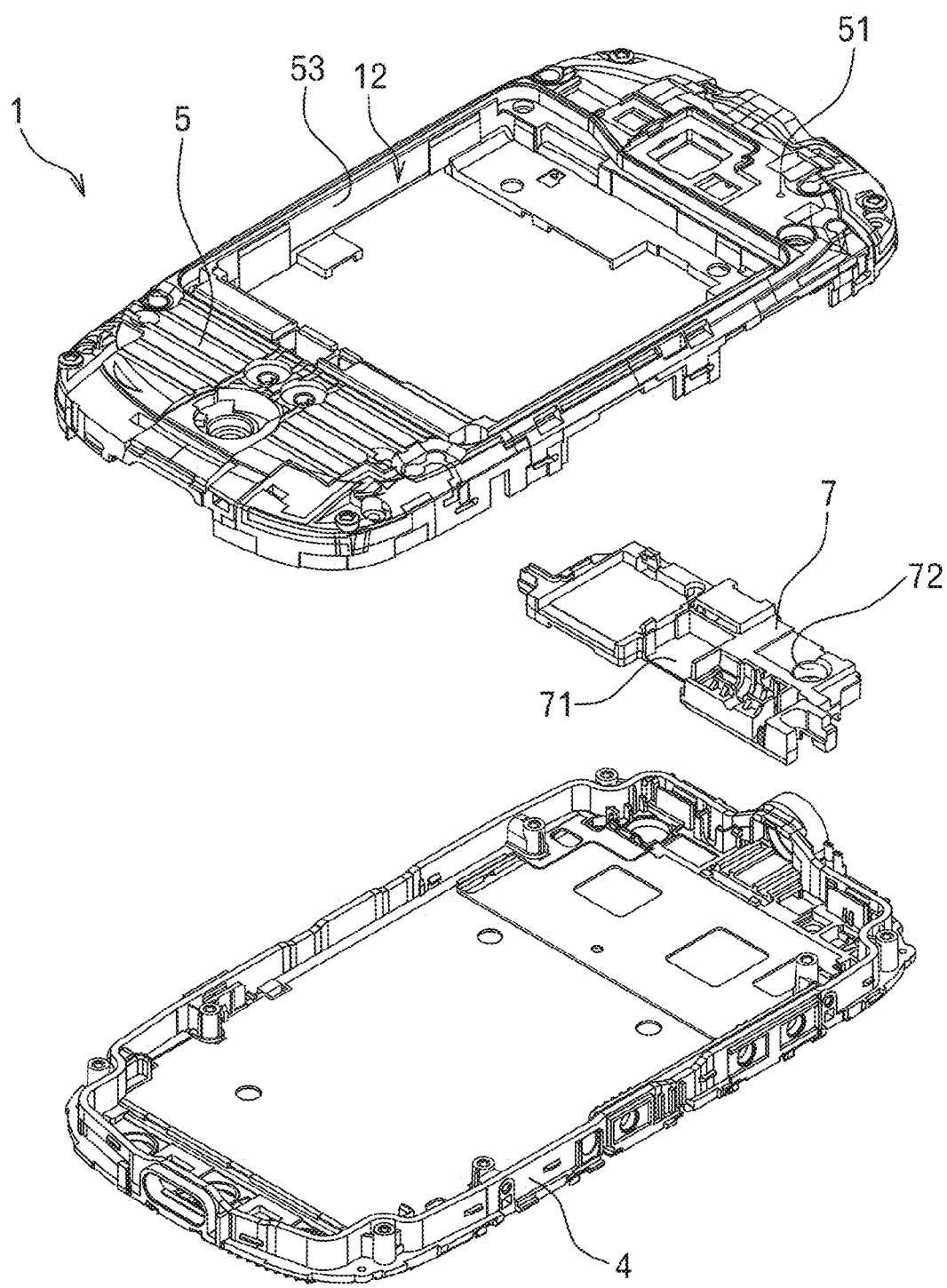
FIG. 5 is an exploded perspective view of a front body chassis and the back body chassis.

As illustrated in FIG. 5, the main body 1 comprises a front body chassis 4 made of a synthetic resin and a back body chassis 5 made of a synthetic resin which are joined together. A holder 7 which includes a camera mounting portion 71 and is made of a synthetic resin is interposed between the front body chassis 4 and the back body chassis 5.

A battery housing chamber 12 surrounded by a peripheral wall 53 is formed on the back body chassis 5.

Figure 3:
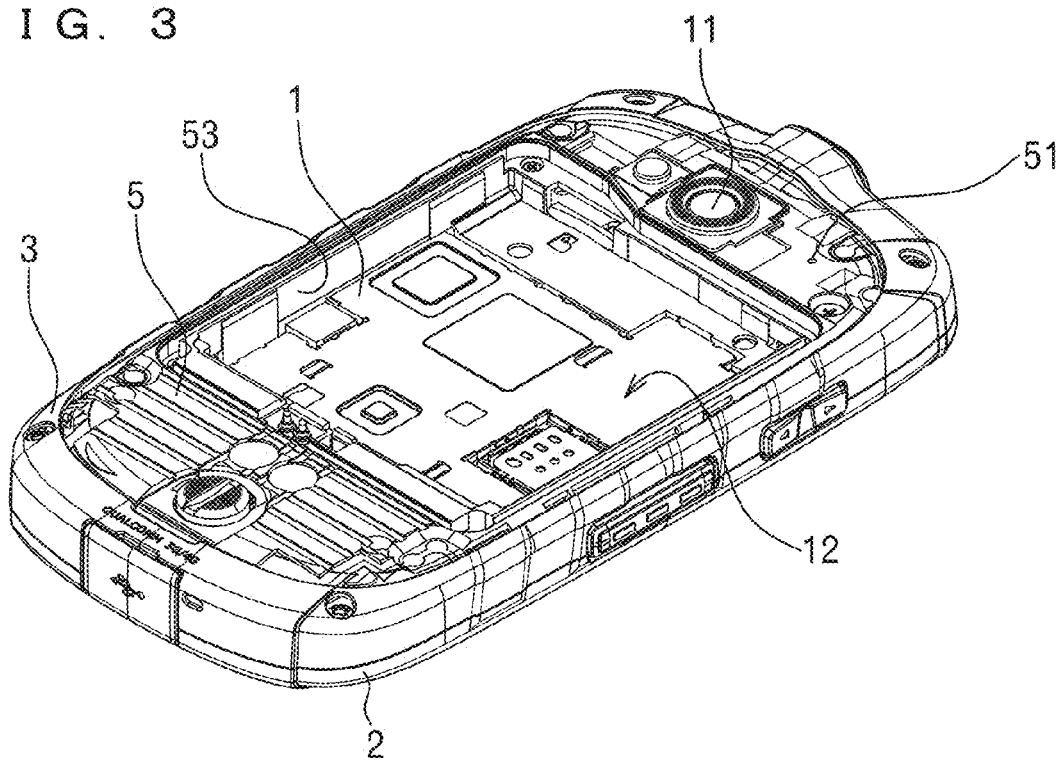
FIG. 3 is a perspective view illustrating a state in which a battery cover is detached from a main body.
Figure 4:
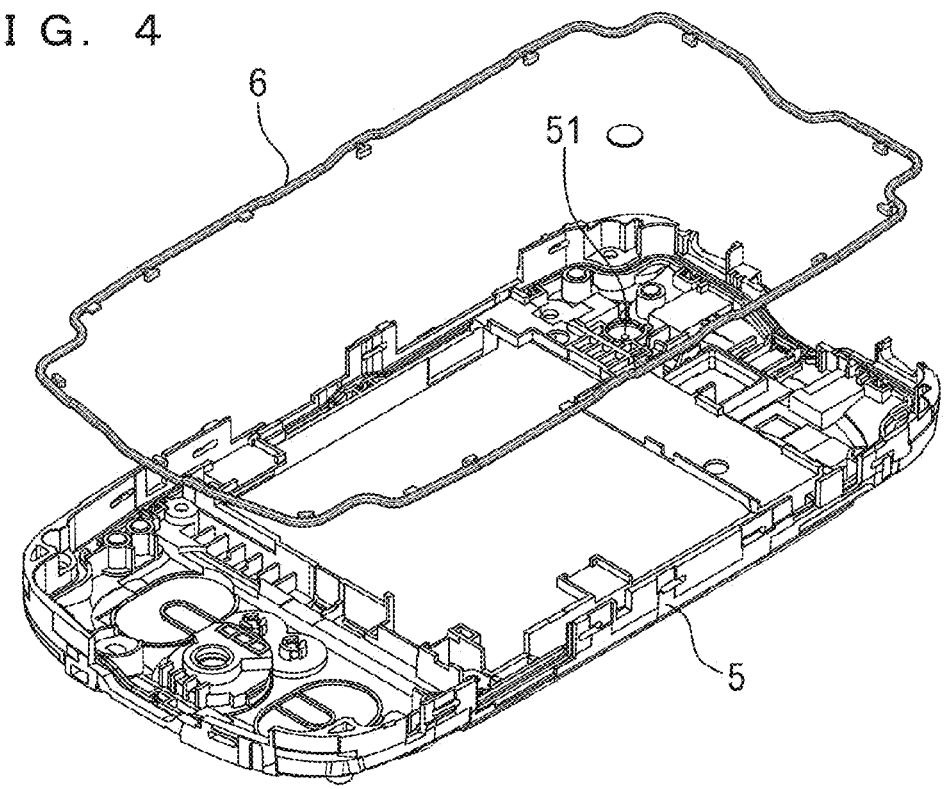
FIG. 4 is a perspective view illustrating a back body chassis and a waterproof packing.

A ring-like waterproof packing 6 illustrated in FIG. 4 is interposed between the front body chassis 4 and the back body chassis 5 to achieve a waterproof structure for an internal space of the main body 1. Further, attaching the battery cover 31 to cover the battery housing chamber 12 of the main body 1 as illustrated in FIG. 3 achieves waterproofing for the battery housing chamber 12.

Figure 6:
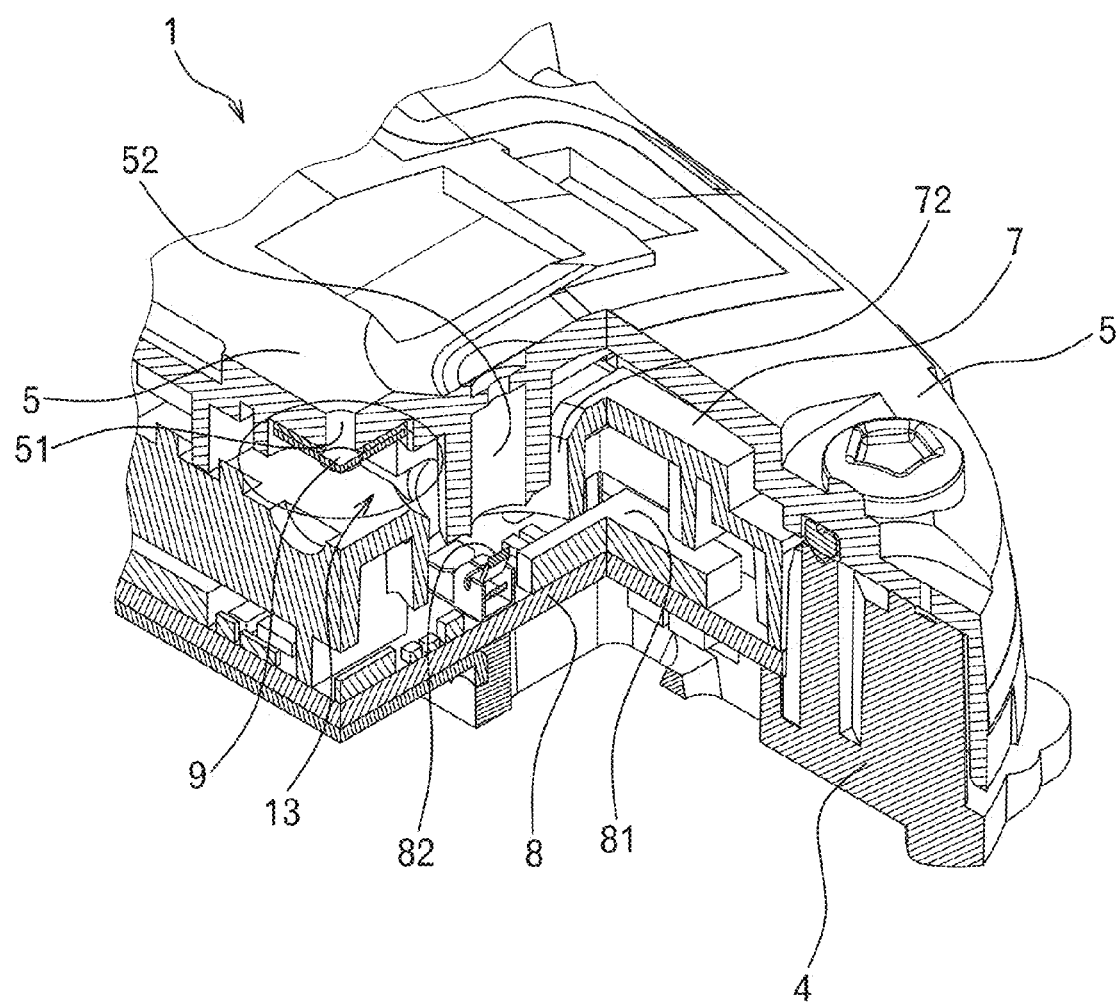
FIG. 6 is a partially cutaway perspective view illustrating a principal part of the present invention.

As illustrated in FIG. 6, a circuit board 8 is housed in the waterproofed internal space of the main body 1. A plurality of electronic components and an atmospheric pressure sensor 81 are mounted on the circuit board 8.

As illustrated in FIG. 5, an air hole 51 is formed on the back body chassis 5. The air hole 51 penetrates the back body chassis 5 and communicates with the internal space. As illustrated in FIG. 6, the air hole 51 is blocked by a breathable waterproof sheet 9 from the inner side of the back body chassis 5.

The breathable waterproof sheet 9 allows passage of air, but blocks passage of water.

The position of the atmospheric pressure sensor 81 on the circuit board 8 and the position of the air hole 51 on the back body chassis 5 are displaced from each other in a direction along the surface of the circuit board 8 for the purpose of component layout. However, the atmospheric pressure sensor 81 and the air hole 51 are arranged as close as possible to each other.

A through hole 72 is formed on the holder 7 and penetrates the holder 7. A cylindrical boss 52 which projects from the back body chassis 5 is inserted into the through hole 72 with a sufficient allowance. A metal pin (not illustrated) for electrically connecting an antenna (not illustrated) embedded in the back body chassis 5 to a contact member 82 on the circuit board 8 is attached to the boss 52.

The back body chassis 5 has an air flow passage 13 which is formed from the air hole 51 to the surface of the atmospheric pressure sensor 81 through a cylindrical space formed between the outer peripheral face of the boss 52 and the inner peripheral face of the through hole 72.

The air hole 51 of the back body chassis 5 is covered with the battery cover 31 which is attached to the back body chassis 5. However, since the air hole 51 is located outside the waterproof structure between the back body chassis 5 and the battery cover 31, the air hole 51 communicates with an external space of the main body 1 through, for example, a gap between the back cover panel 3 and the battery cover 31.

In the above mobile phone, every time the touch operation surface 10 is pressed for input, the front body chassis 4 and the back body chassis 5 are slightly elastically deformed to cause contraction and expansion of the internal space of the main body 1. Since the air hole 51 is formed on the back body chassis 5 and the air flow passage 13 leading from the air hole 51 to the atmospheric pressure sensor 81 is formed, air flows out through the air hole 51 or flows in through the air hole 51 along with the contraction and expansion of the internal space. As a result, a space near the atmospheric pressure sensor 81 is maintained at the same atmospheric pressure as that around the main body 1.

The holder 7 is interposed between the front body chassis 4 and the back body chassis 5. However, since the through hole 72 formed on the holder 7 forms a part of the air flow passage 13, the air flow passage 13 is not blocked by the holder 7. Thus, a long response delay or detection error does not occur in a detection operation performed by the atmospheric pressure sensor 81. Therefore, it is possible to detect the ambient atmospheric pressure with high accuracy.

Further, various functions such as altitude measurement are achieved on the basis of the atmospheric pressure detection performed by the atmospheric pressure sensor 81.

The configurations of the respective members of the present invention are not limited to the above embodiment. A person skilled in the art may make various modifications without departing from the spirit of the invention described in the claims. Further, the present invention may be applied not only to mobile phones, but also to various electronic devices provided with a touch operation surface.

DESCRIPTION OF REFERENCE CHARACTERS 1 main body
10 touch operation surface
13 air flow passage
2 front cover panel
3 back cover panel
31 battery cover
4 front body chassis
5 back body chassis
51 air hole
6 waterproof packing
7 holder
72 through hole
8 circuit board
81 atmospheric pressure sensor
9 breathable waterproof sheet

The invention claimed is:

1. A touch input electronic device comprising:
a main body having a waterproofed internal space and an air hole located on a surface thereof;
an operation surface disposed on the surface of the main body, the operation surface receiving touch input;
an atmospheric pressure sensor disposed in the internal space;
an air flow passage formed inside the main body, the air flow passage leading from the air hole to the atmospheric pressure sensor; and
a breathable waterproof sheet blocking the air hole;
wherein
the main body includes a pair of body chassis joined together with a waterproof packing interposed therebetween,
the internal space is formed between the pair of body chassis,
the air hole is formed on one of the body chassis,
a holder holding an electronic component is interposed between the pair of body chassis,
the air hole and the atmospheric pressure sensor are located on opposite sides across the holder, and
a through hole forming a part of the air flow passage is formed on the holder.

2. The touch input electronic device according to claim 1, wherein a boss is provided on one side of the one body chassis, said boss being located in the through hole.

3. The touch input electronic device according to claim 1, wherein a metal member is located in the through hole, the metal member being electrically connected between an antenna element provided on said one side of the one body chassis and a circuit board.

* * * * *